US011468326B2

(12) United States Patent
Thanabalan et al.

(10) Patent No.: US 11,468,326 B2
(45) Date of Patent: Oct. 11, 2022

(54) HIGH-RISK PASSAGE AUTOMATION IN A DIGITAL TRANSACTION MANAGEMENT PLATFORM

(71) Applicant: DocuSign, Inc., San Francisco, CA (US)

(72) Inventors: Matt Thanabalan, Chicago, IL (US); Roshan Satish, Seattle, WA (US); Brian Delegan, Chicago, IL (US); Bilal Aslam, Amsterdam (NL)

(73) Assignee: DOCUSIGN, INC., San Francisco, CA (US)

( * ) Notice: Subject to any disclaimer, the term of this patent is extended or adjusted under 35 U.S.C. 154(b) by 340 days.

(21) Appl. No.: 16/870,534

(22) Filed: May 8, 2020

(65) Prior Publication Data

US 2021/0350227 A1 Nov. 11, 2021

(51) Int. Cl.
*G06N 3/08* (2006.01)
*G06K 9/62* (2022.01)
*H04L 9/32* (2006.01)
*G06F 16/901* (2019.01)
*G06F 16/93* (2019.01)

(52) U.S. Cl.
CPC .......... *G06N 3/08* (2013.01); *G06F 16/9027* (2019.01); *G06F 16/93* (2019.01); *G06K 9/6256* (2013.01); *H04L 9/3247* (2013.01)

(58) Field of Classification Search
None
See application file for complete search history.

(56) References Cited

U.S. PATENT DOCUMENTS

| 9,634,975 B2 | 4/2017 | McCabe et al. |
| 10,430,570 B2 | 10/2019 | Gonser et al. |
| 2016/0125169 A1 | 5/2016 | Finn et al. |
| 2016/0321582 A1 | 11/2016 | Broudou et al. |
| 2018/0268506 A1* | 9/2018 | Wodetzki ............. G06V 30/413 |

(Continued)

FOREIGN PATENT DOCUMENTS

| EP | 3869445 A1 * | 8/2021 | |
| WO | WO-2021040124 A1 * | 3/2021 | ............... G06K 9/20 |

OTHER PUBLICATIONS

International Search Report and Written Opinion, Patent Cooperation Treaty Application No. PCT/US2021/028736, dated Jul. 26, 2021, 21 pages.

*Primary Examiner* — Uyen T Le

(74) *Attorney, Agent, or Firm* — Fenwick & West LLP

(57) ABSTRACT

A document execution engine receives a training set of data including training documents that each include one or more passages associated with a passage type and a level of risk. The document execution engine trains a machine learned model based on the training set. The trained machine learned model, when applied to subsequently identified passages within documents in the document execution environment, can identify a passage with above threshold levels of risk (e.g., a high-risk passage) based on a passage type of the passage. The trained machine learned model can then provide for display the high-risk passage and a related passage of the same passage type from a second document within the document execution environment to the user via a document passage comparison interface. Differences between the passages can be highlighted, enabling a user to quickly compare and contrast the passages.

20 Claims, 4 Drawing Sheets

(56) References Cited

U.S. PATENT DOCUMENTS

| | | |
|---|---|---|
| 2020/0042531 A1 | 2/2020 | Bhojarajan et al. |
| 2021/0150653 A1* | 5/2021 | Hjertstedt .............. G06F 40/166 |
| 2021/0201013 A1* | 7/2021 | Makhija ............... G06V 30/414 |
| 2022/0019624 A1* | 1/2022 | Gwozdz .................. G06F 16/35 |

* cited by examiner

Compare Clauses: Limitations of Liability

Passage Type 330

MSA-NorthWindCorp.docx (current)

10. Limitations of Liability

10.1 Limitations and Exclusions. Notwithstanding anything in this agreement or anything else to the contrary, except for any claims subject to (or amounts payable pursuant to) other party's obligations of indemnification under section 11, in all events will the receiving party be liable for any incidental, indirect, special, consequential, or punitive damages (including lost profits, costs of delay, failure of delivery, business interruption, data loss, damage or disclosure, or liabilities to third parties arising from any source), regardless of the nature of the claim, even if such a party has been advised of the possibility of such damages. In any event (but without limiting any amounts rightfully owed by customer to Northwind Incorporated pursuant to the terms of this agreement that have not yet been paid), except for any claims subject to (or amounts payable pursuant to) either party's obligations of indemnification under section 11, the cumulative, aggregate liability of each party for any and all claims arising from or relating to this agreement, whether in contract, tort, strict liability, or any other legal theory, shall not exceed the total amount of fees paid to Northwind Incorporated by customer under the applicable order or sow related to the claim during the twelve (12) months

First portion of interface 310

Differences 350

High-Risk Passage 250

Second Document 340

MSA-NorthWind-2017.docx ▼

10. Limitations of Liability

10.1 Limitations and Exclusions. Notwithstanding anything in this agreement or anything else to the contrary, except for any claims subject to (or amounts payable pursuant to) either party's obligations of indemnification under section 11, in no event will either party be liable for any incidental, indirect, special, consequential, or punitive damages (including lost profits, costs of delay, failure of delivery, business interruption, data loss, damage or disclosure, or liabilities to third parties arising from any source), regardless of the nature of the claim, even if such a party has been advised of the possibility of such damages. In any event (but without limiting any amounts rightfully owed by customer to Northwind Incorporated pursuant to the terms of this agreement that have not yet been paid), except for any claims subject to (or amounts payable pursuant to) either party's obligations of indemnification under section 11, the cumulative, aggregate liability of each party for any and all claims arising from or relating to this agreement, whether in contract, tort, strict liability, or any other legal theory, shall not exceed the total amount of fees paid to Northwind Incorporated by customer under the applicable order or sow related to the claim during the twelve (12) months

Related Passage 320

REPLACE FROM CLAUSE LIBRARY

Second portion of interface 330

Interface Element 360

HIGH-RISK PASSAGE AUTOMATION IN A DIGITAL TRANSACTION MANAGEMENT PLATFORM

TECHNICAL FIELD

The disclosure generally relates to the field of passage automation, and specifically to high-risk passage automation in a digital transaction management platform.

BACKGROUND

An entity may provide or create a document for execution within an online document execution environment (or "online document system"). Conventional document execution environments enable users to view and execute documents, but do not provide intelligent analyses of document contents. To provide an improved, efficient, and more reliable document execution experience to the user, there is a need for a system that analyzes content based on characteristics of the documents, and provides recommendations to users of the document execution environment based on this analysis.

SUMMARY

A method for detecting high-risk passages in a document within a document execution environment is described herein. A training set of information that includes training documents within the document execution environment are accessed, each training document including one or more passages corresponding to a passage type and a level of risk. A machine learned model is trained based on the accessed training set of information such that the trained machine learned model is configured to determine a level of risk associated with a document passage based at least in part on the passage type of the document passage.

A document for execution within the document execution environment is accessed, and the trained machine learned model is applied to one or more passages identified within the accessed document. The trained machine learned model determines, for each identified passage, an associated level of risk based on a passage type of the identified passage. In response to determining that the level of risk associated with an identified passage is above a threshold, a related passage of the same passage type is identified within a second document in the document execution environment. The identified passage associated with the above-threshold level of risk is provided for display within a first portion of an interface of a user device and the identified related passage within the second document is provided for simultaneous display within a second portion of the interface.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates an example document execution environment in which high-risk passages within documents can be identified, in accordance with one or more embodiments.

FIG. 3 illustrates an example interface in which a high-risk passage may be presented to a user, in accordance with one or more embodiments.

DETAILED DESCRIPTION

Figure 1:
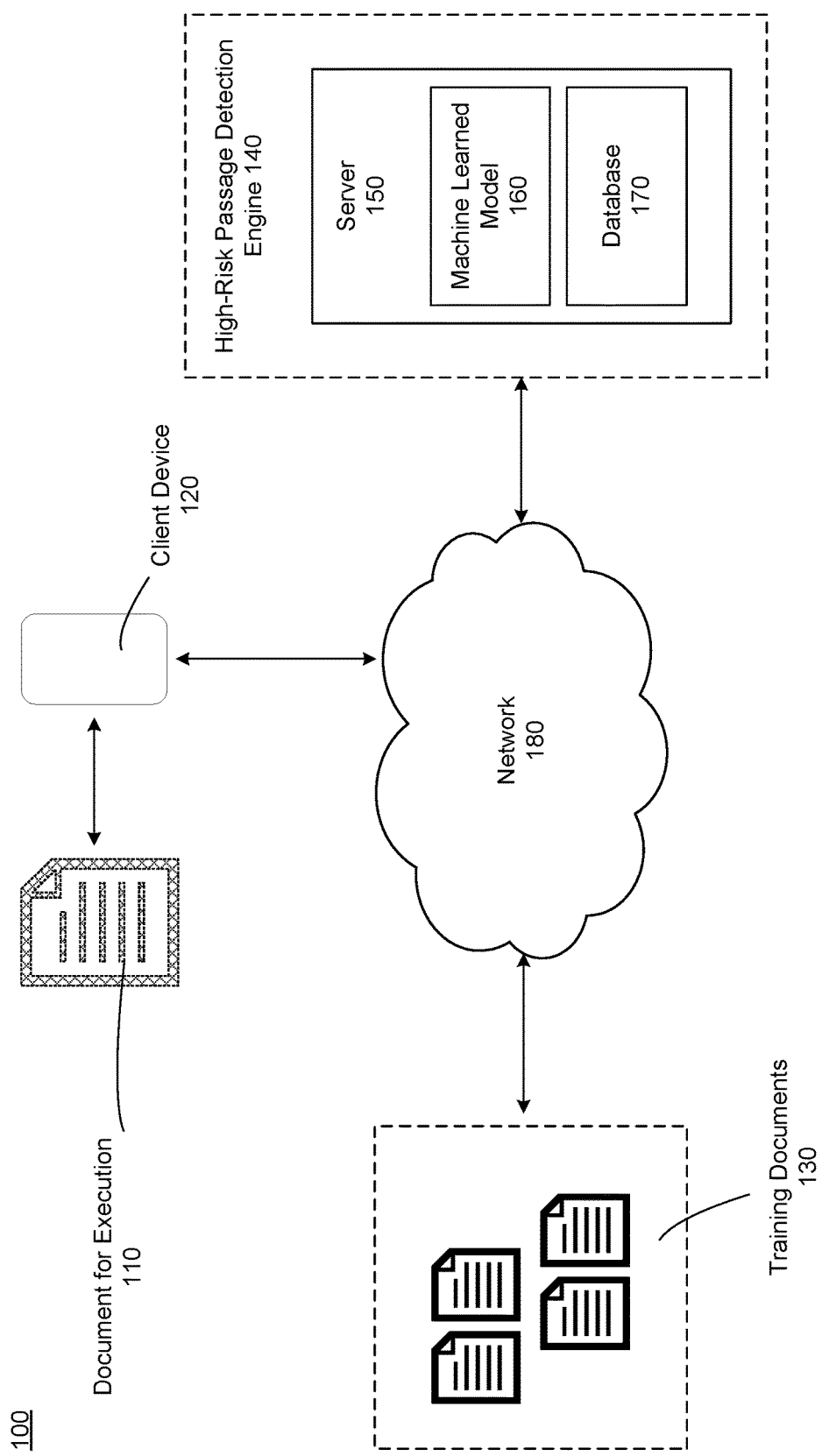

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Document Execution Environment Overview

The methods described herein use machine learning to identify high-risk passages within a document in a document execution environment. A document execution environment enables a party (e.g., individuals, organizations, etc.) to create and send documents to one or more receiving parties for negotiation, collaborative editing, electronic execution (e.g., electronic signature), automation of contract fulfillment, archival, and analysis. Within the document execution environment, a receiving party may review content and/or terms presented in a digital document, and in response to agreeing to the content and/or terms, can electronically execute the document. In some embodiments, the receiving party provides the sending party (e.g., the party that created and sent the document for execution) with feedback on the content and/or terms in the document received for execution. In some embodiments, the receiving party completes and/or contributes to a portion of the content and/or terms in the document. Additionally, the sending party may access and/or share data associated with the document within the document execution environment, such as a time and location at which the receiving party accesses, views, and/or executes the document. In some embodiments, the receiving and/or sending parties also have access to archival data of similar documents. In some embodiments, the document execution environment enables payments between the receiving and sending parties. DocuSign, Inc's e-Signature product is an example of functionality that is implemented within a document execution environment. A document execution environment and example functionality is further described in U.S. Pat. No. 9,634,975, issued Apr. 25, 2017, and U.S. Pat. No. 10,430,570, issued Oct. 1, 2019, which are hereby incorporated by reference in their entireties.

The system environment described herein can be implemented within an online document system, a document execution system, or any type of digital transaction management platform. It should be noted that although description may be limited in certain contexts to a particular environment, this is for the purposes of simplicity only, and in practice the principles described herein can apply more broadly to the context of any digital transaction management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

The processes described herein help users identify passages in documents within the document execution environment that are associated with a level or risk or liability that exceeds one or more user- or entity-defined thresholds. The document execution environment inputs a passage to a machine learned model trained on historical documents, the machine learned model configured to output the passage's associated risk. The document execution environment accordingly identifies high-risk and/or anomalous passages that differ from similar passages of the same type, which thereby triggers a set of actions. For example, the document execution environment enables users to compare and contrast high-risk passages with similar passages in other documents within the document execution environment. Thus, the document execution environment is able to improve automation of the document review process.

FIG. 1 illustrates an example document execution environment 100 in which high-risk passages within documents can be identified, in accordance with one or more embodiments. As described above, the document execution environment 100 enables a sending party to create and send digital documents for electronic execution to one or more receiving parties. The receiving parties may review, modify, and execute the documents. The document execution environment 100 uses a machine learned model to identify high-risk passages in a document sent for execution. As used herein, a "high-risk passage" refers to a passage associated with a risk that exceeds a risk threshold, though it should be noted that passages identified as high-risk may in practice not be particularly risky (for instance, if the risk threshold is low). As illustrated in FIG. 1, the document execution environment includes a document for execution 110, a client device 120, a set of training documents 130, and a high-risk passage detection engine 140, each communicatively interconnected via a network 180. In some embodiments, the document execution environment includes components other than those described herein. For the purposes of concision, the web servers, data centers, and other components associated with an online document execution environment are not shown in the embodiment of FIG. 1.

The document for execution 110 is analyzed to identify high-risk passages within the document. Each document for execution 110 can include one or more passages (e.g., legal clauses, financial terms, and the like) that each associated with a passage type. Examples of documents for execution 110 include but are not limited to: a sales contract, a permission slip, a rental and/or lease agreement, a liability waiver, a financial document, an investment term sheet, a purchase order, an employment agreement, a mortgage application, and so on. The document execution environment 100 receives the document for execution 110 from the sending party via the client device 120 (or receives instructions to create the document within the document execution environment 100 from the client device 120) and provides it to the receiving party (not illustrated in the embodiment of FIG. 1), for instance, for signing. It should be noted that although examples are given herein in the context of a single document, the document execution environment 100 can coordinate the creation, viewing, editing, and signing of any number of documents (e.g., thousands, millions, and more) for any number of users or accounts, and for any number of entities or organizations.

The client device 120 provides the document for execution 110 to the document execution environment 100. The client device 120 is a computing device capable of transmitting and/or receiving data over the network 190. The client device 120 may be a conventional computer (e.g., a laptop or a desktop computer), a cell phone, or a similar device. The client device 120 enables a user (e.g., of the sending party) to create and/or provide the document for execution 110 to the document execution environment 100. After the document execution environment 100 determines that a passage in the document for execution 110 is high-risk, the client device 120 notifies the user of the high-risk passage and/or provides, to the user, a related passage from another document for comparison. In some embodiments, the client device 120 simultaneously displays the high-risk passage and the related passage within two interface portions of a user interface of the client device 120. Likewise, in some embodiments, the threshold level of risk or a passage type can be received from the user (for instance, via the client device 120) for use in identifying high-risk passages within the document.

The training documents 130 serve as a training set of information for training the machine learned model to determine levels of risk associated with passages in documents for execution 110. In some embodiments, one or more users responsible for creating and/or managing the training documents 130 manually curate and/or provide, to the document execution environment 100, a type of passage and a level of risk associated with each of the passages in the training documents 130. For example, the training set of information can include historical documents associated with the document execution environment 100, each historical document including one or more passages associated with specified passage types and specified levels of risk.

The high-risk passage detection engine 140 identifies high-risk passages within the document for execution 110 using a machine learned model 160. In response to identifying a high-risk passage, the high-risk passage detection engine 140 identifies at least one related passage of the same passage type from another document in the document execution environment 100. The high-risk passage detection engine 140 presents to the user, via the client device 120, the high-risk passage and the related passage for comparison. In some embodiments, the high-risk passage detection engine 140 identifies high-risk passages in more than one document for execution. Likewise, the high-risk passage detection engine 140 can detect high-risk passages and/or documents across an account (such as an account associated with a user or a company), or can detect high-risk passages and/or documents across an organization. The high-risk passage detection engine 140 includes a server 150, which hosts and/or executes a machine learned model 160 and a database 170.

The server 150 stores and receives information from the document execution environment 100. The server 150 may be located on a local or remote physical computer and/or may be located within a cloud-based computing system. The server 150 accesses the document for execution 110, for instance by receiving it from the client device 120, by retrieving the document from storage associated with the document execution environment 100, and the like. In some embodiments, the server 150 identifies the passages and the respective passage types within the document for execution 110. It should be noted that in some embodiments, the document for execution 110 is provided to and stored by a system other than server 150. In these embodiments, the high-risk passage detection engine 140 can perform one or more risk detection operations configured to determine a level of risk associated with the document, passages within the document, and/or with the system that stores the document.

The machine learned model 160 is configured to determine a level of risk associated with a passage within the document for execution 110, based on various factors, including but not limited to a passage type of the passage. The machine learned model 160 is trained on a training set of information. The training set of information includes the training documents 130, each including passages associated with a level of risk and a passage type. After being trained, the machine learned model 160 is applied to passages identified within the document for execution 110. In some embodiments, the machine learned model 160 is applied to a plurality of passages within the document for execution 110 to determine an overall level of risk associated with the document for execution 110. In other embodiments, the machine learning model 160 is applied to a plurality of passage across a plurality of documents for execution 110, associated with one or more accounts, or associated with one or more organizations or entities. The machine learned model 160 then outputs a determined associated level of risk for each passage within the one or more documents for execution 110, for instance based on a passage type of each passage. The training and application of the machine learned model 160 is further discussed with respect to FIG. 2.

The database 170 stores information relevant to the high-risk passage detection engine 140. The stored data includes, but is not limited to, the document for execution 110, passages within the document for execution 110, the training set of information, the training documents 130, and so on. In some embodiments, the database 170 stores passages of a plurality of types, each associated with a level for risk. The high-risk passage detection engine 140 can add such information to the training set of information, and can retrain the machine learned model 160 based on this information.

The network 180 transmits data within the document execution environment 100. The network 180 may be a local area and/or wide area network using wireless and/or wired communication systems, such as the Internet. In some embodiments, the network 180 transmits data over a single connection (e.g., a data component of a cellular signal, or Wi-Fi, among others), and/or over multiple connections. The network 180 may include encryption capabilities to ensure the security of customer data. For example, encryption technologies may include secure sockets layers (SSL), transport layer security (TLS), virtual private networks (VPNs), and Internet Protocol security (IPsec), among others.

Training and Application of Machine Learned Model

Figure 2:
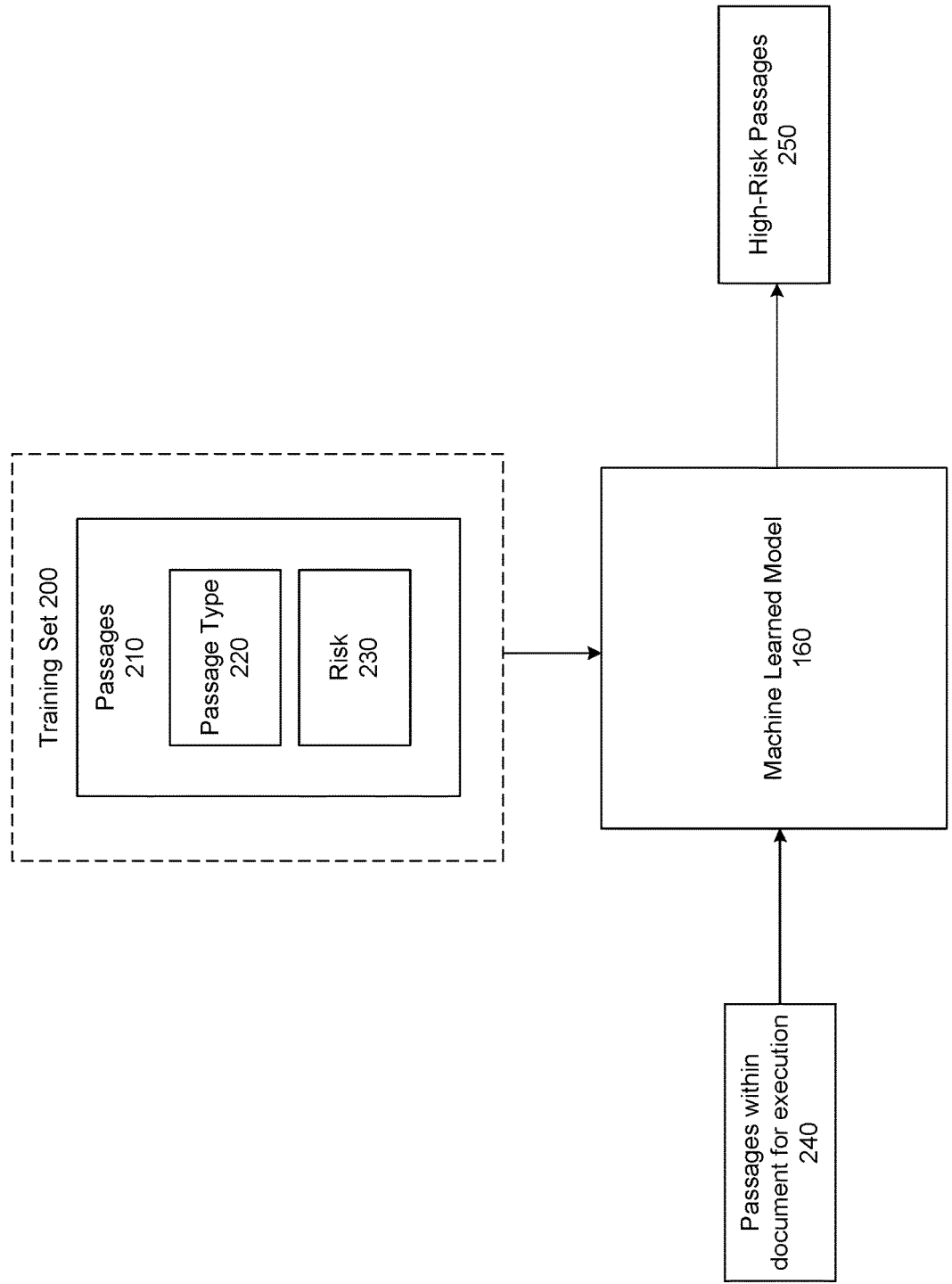
FIG. 2 illustrates the training and application of a machine learning model configured to determine a level of risk associated with passages within a document, in accordance with one or more embodiments.

FIG. 2 illustrates the training and application of a machine learning model configured to determine a level of risk associated with passages within a document, in accordance with one or more embodiments. As described with respect to FIG. 1, the machine learned model 160 takes, as input, passages within the document for execution 110 to determine a level of risk associated with each of the passages. The machine learning model 160 determines the level of risk based on, for example, types of the passages, a type of the document for execution 110, an industry associated with the document for execution 110, and so on. The high-risk passage detection engine 140 identifies passages that have a determined risk above a threshold level (e.g., a high-risk passage) and presents the high-risk passage to the user of the client device 120 along with a related passage of the same type from another document. In some embodiments, the high-risk passage detection engine 140 provides recommendations to the user to mitigate the risk associated with the high-risk passage.

The high-risk passage detection engine 140 trains the machine learned model 160 using a training set of information 200 (e.g., "the training set 200"). The training set 200 includes passages 210 (e.g., passages found within the training documents 130), each associated with a passage type 220 and a level of risk 230. In some embodiments, the training set 200 additionally includes actions that help mitigate each passage's risk (not included in FIG. 2). The passages 210, the associated passage types 220 and risks 230, and the actions resulting in risk mitigation may be provided via client devices (which may be substantially similar to the client device 120) to the document execution environment 100. In other embodiments, the document execution environment 100 may automatically identify the passages 210, their associated passage types 220 and risks 230, and/or actions resulting in risk mitigation to add to the training set 200. In other embodiments, a user of the document execution environment 100 may manually input or curate a subset of the passages 210, passage types 220, associated risks 230, and the actions resulting in risk mitigation. It should be noted that the information included in the training set 200 may be representative of historical documents within the document execution environment 100. The training set 200 may also include information about the training documents 130 from which the passages 210 originate, and the machine learned model may be trained on this additional information. Examples of this information may include, for each document: a type of the document, size of the document, languages within the document, region in which the document originated, characteristics associated with the sending and receiving party of the document (e.g., size, industry, location of headquarters, revenue, corporate structure), types or categories of information or passages within the document, and the like. In some embodiments, the training set 200 includes additional information about documents (e.g., document lifecycle data) associated with a system, customer and/or organization of the document execution environment 100.

The passages 210 are portions of a document, and may include text, images, or other material of any length. In some embodiments, a passage 210 corresponds to a legal clause, a business clause, financial agreement text, and the like. For example, a training document 130 may include a plurality of passages 210, each corresponding to a different header within the document. In some embodiments, the passages 210 are manually flagged, for instance by a document creator, while in other embodiments, the passages 210 are identified automatically, for instance based on a header associated with the passage, based on a signature or initials field associated with the passage, or based on any other characteristic associated with the passage. It should be noted that not every portion of a document or of text within a document may be considered a "passage" for the purposes of the description here. Each passage 210 is associated with a passage type 220 and a risk 230. The associated passage type 220 characterizes content of the passage as corresponding to a particular category of the passage. Examples of passage types include but are not limited to an indemnity clause, a merger and integration clause, a severability clause, a fees clause, a damages clause, a pricing clause, a purchase clause, a payment clause, and so on.

The associated risk 230 characterizes a level of risk and/or liability associated with the content of each passage 210. For example, risk may be defined as a legal risk, a liability, a financial exposure, a business implication, and the like. The risk 230 associated with a passage may be based on the passage type 220, content of the passage, a type, organization, and/or industry associated with the document from which the passage originated, a position or identity of the sending and/or receiving party, and so on. In some embodiments, the risk 230 may be designated by one or more models configured to identify anomalies in each passage 210 and/or differences in the passage 210 as compared to passages of the same type from other documents within the document execution environment 100. In some embodiments, an organization and/or customer associated with the document from which the passage originated specifies a custom definition of risk. The risk 230 can be represented numerically, for instance, as a likelihood that the passage will result and/or has resulted in legal risk, categorically (e.g., "high-risk", "moderate risk", "low risk"), or in any other suitable way. In some embodiments, the risk 230 is designated as above or below a threshold level of risk. Users of the document execution environment 100, network administrators, security personnel, and/or an entity associated with the document execution environment 100 may define the threshold level of risk and/or liability. In some embodiments, the threshold level of risk and/or liability may be determined automatically (e.g., by an algorithm configured to determine a level of risk acceptable to an entity associated with the document). The threshold level of risk and/or liability may vary based on the passage type 220, the type of document from which the passage originated, an industry associated with the document, and so on. In some embodiments, a risk threshold corresponds to a particular passage type, a monetary value associated with a passage, a number of signatories associated with the passage, and the like. Accordingly, for a document that includes multiple passages, for instance each with a different passage type, the risk threshold associated with each passage may vary.

As mentioned above, in some embodiments, the training set 200 includes actions that resulted in mitigation of the risk 230 associated with one or more passages. The mitigating actions can be actions that were taken in response to training passages having an above threshold level of risk (e.g., high-risk passages). Examples of mitigating actions include risk driven actions, such as replacing the high-risk passages with lower-risk content, flagging the high-risk passages for further review from additional users that may be most qualified to review the type of passage, requiring additional signatories on documents including the high-risk passages, limiting access to documents including the high-risk passages, notifying an entity (such as the receiving party, the sending party, an account manager, or a network administrator) of the high-risk passage, and the like. The actions may also include risk driven reporting, such as presenting dashboards with graphics and information associated with the high-risk passages, notifying a user of the sending and/or receiving party of the document of other passages impacted by the high-risk passages, and so on. In some embodiments, the actions are determined based on feedback from a sending and/or receiving party of the document, one or more authors of the high-risk passages, from an account or network manager, automatically by algorithm, or based on any other suitable criteria. In some embodiments, the actions are determined based on information about the documents from which the high-risk passages originate, such as a geographic region, language, and/or industry associated with the documents.

The training set 200 may be separated into a positive training set and a negative training set. The positive training set includes a subset of the passages 210, associated passage types 220, and associated risks 230 that are designated (for instance, by the users of the document execution environment 100) as above a threshold level of risk, as well as any associated actions taken to mitigate the associated risk 230. The negative training set includes another subset of the passages 210, associated passage types 220, and associated risks 230 that are designated as below a threshold level of risk.

The high-risk passage detection engine 140 uses supervised or unsupervised machine learning to train the machine learned model 160 using the positive and negative training sets of the training set 200. Different machine learning techniques may be used in various embodiments, such as linear support vector machines (linear SVM), boosting for other algorithms (e.g., AdaBoost), neural networks, logistic regression, naïve Bayes, memory based learning, random forests, bagged trees, decision trees, boosted trees, or boosted stumps. The training of the machine learned model 160 helps the machine learned model 160 identify relationships between the passages 210, associated passage types 220, associated risks 230, and any actions taken to mitigate their associated risks 230. In other words, training the machine learned model 160 enables the machine learned model 160 to identify the relationships between documents within the document execution environment 100, passages within the documents, and risks associated with the passages to determine levels of risk associated with subsequently received passages in documents for execution 110.

The trained machine learned model 160, when applied to identified passages 240 within the document for execution 110, determines a level of risk associated with each of the passages 240. The trained machine learned model 160, in some embodiments, determines a passage type of each of the passages 240, and based on the determined passage type, determines a risk associated with each passage. In some embodiments, the trained machine learned model 160 determines the risk associated with each passage based on characteristics of the document for execution 110 (e.g., a document type, a region, a language, an industry). The trained machine learned model 160 (or the high-risk passage detection engine 140 or any other suitable component) determines whether the determined risk associated each passage exceeds a risk threshold. In some embodiments, an organization and/or company associated with the document for execution 110 provides the high-risk passage detection engine 140 with a custom definition of risk, based on which the machine learned model 160 outputs the associated level of risk. Passages 240 determined to be associated with an above-threshold risk (e.g., the high-risk passages 250) are identified for display to a user. In some embodiments, the high-risk passages 240 originate from a plurality of documents for execution 110, one or more user accounts, or one or more organizations or entities. The passage type of each of the passages 240, determined by the trained machine learned model 160, may be any of the passage types 220 associated with the passages 210 in the training set 200.

In some embodiments, the trained machine learned model 160 outputs recommended mitigating actions for the user to take that increase a probability of mitigating the risk associated with the high-risk passage 250. The recommended mitigation actions may be presented within a dedicated interface portion or an interface overlay, and may include an interface element that, when interacted with, cause one or more of the mitigating actions to be performed. In some embodiments, the high-risk passage detection engine 140 may automatically perform one or more of the recommended actions associated with the high-risk passage 250, for instance in response to the determined risk associated with a passage exceeding the risk threshold by more than a threshold amount. In some embodiments, the high-risk passage detection engine 140 automatically performs the recommended actions after a passage of a threshold amount of time without action by a user.

In response to the trained machine learned model 160 identifying the high-risk passages 250, the high-risk passage detection engine 140 displays a high-risk passage 250 to the user via the client device 120. In some embodiments, the high-risk passage detection engine 140 identifies, from another document in the document execution environment 100, a related passage of the same type as the high-risk passage 250. For example, for a high-risk passage associated with a property damage liability in Oregon, the high-risk passage detection engine 140 may identify another document that includes an Oregon property damage liability clause. In some embodiments, the high-risk passage detection engine 140 identifies a related passage of the same type from other documents of a same document type as the document for execution 110, from other documents authored by a same author as the document for execution 110, from documents associated with a same company or organization as the document for execution 110, from documents associated with a same geography or industry as the document for execution 110, and the like.

The high-risk passage detection engine 140 simultaneously displays the high-risk passage 250 and the related passage of the same passage type to the user via the client device 120. In some embodiments, the user interface of the client device 120 also indicates differences between the high-risk passage 250 and the related passage of the same passage type (for instance, by highlighting or underlying the differences between passages). FIG. 3 depicts one embodiment of the user interface that enables the user of the client device 120 to compare the high-risk passage 250 and the related passage of the same type.

The high-risk passage detection engine 140 notifies the user of the client device 120 of the high-risk passage 250, the related passage of the same passage type, and/or the recommended actions to mitigate the associated risk. In some embodiments, the user provides feedback on whether the risk determined by the machine learned model 160 is accurate or not, which is subsequently added to the training set 200 for re-training of the machine learned model 160. In some embodiments, the user can manually re-define a level of risk associated with a passage, a threshold level of risk and/or liability for use in determining whether a passage is a high-risk passage, and types of mitigating actions that can be taken to mitigate the risk. The high-risk passage detection engine 140 can subsequently re-train the machine learned model 160 based on these user definitions.

Example Presentation of High-Risk Passage within Document Execution Environment

FIG. 3 illustrates an example interface in which the high-risk passage 250 may be presented to a user, in accordance with one or more embodiments. After identifying a plurality of passages within the document for execution 110, the high-risk passage detection engine 140 identifies a passage (high-risk passage 250) as being associated with a level of risk greater than a threshold level of risk and presents the high-risk passage 250 to the user of the client device 120.

The high-risk passage detection engine 140 presents the high-risk passage 250 within a first portion of an interface 310. The high-risk passage detection engine 140 identifies a related passage 320 of a same passage type 330 from a second document 340 within the document execution environment 100. In some embodiments, a number of related passages 320 may be identified from one or more documents in the document execution environment. In some embodiments, the related passage 320 is identified based on a similarity between content of the related passage 320 and content of the high-risk passage 250. For example, if the content of the two passages has an above-threshold level of similarity, the high-risk passage detection engine 140 identifies the passage from the second document 340 as related. In FIG. 3, the passage type 330 is identified as a "limitations of liability clause," and the second document 340 is "MSA-NorthWind-2017."

The high-risk passage detection engine 140 highlights differences 350 in content of the high-risk passage 250 and the related passage 320. In some embodiments, the user of the client device 120 provides input, via interface elements, indicating one or more actions to take in association with the high-risk passage 250. For example, an interaction with an interface element 360 causes the high-risk passage 250 to be replaced with the related passage 320. Other examples of actions caused by interacting with the interface element 360 include sending the high-risk passage 250 to one or more entities for additional review, flagging the high-risk passage 250 as low-risk, limiting signatories of the document for execution 110, and sending the document for execution 110 to a receiving party for signature. The recommended mitigating actions identified by the trained machine learning model 160, as described above with respect to FIG. 2, may be displayed within a recommendation portion of the interface. In some embodiments, the interface alerts the user of other unexecuted documents with content similar to that of the high-risk passage 250.

In some embodiments, the interface of the client device 120 enables the user to access a library of passages of various types. The library may be organized into different types of passages and passage templates, may provide access to documents from which the passages originated, may list risk levels associated with each of the passages, and so on. Accordingly, the user may select an appropriate passage to reference (e.g., within the second portion of the interface 330) when reviewing the high-risk passage 250.

Process for Identifying High-Risk Passages in a Document

Figure 4:
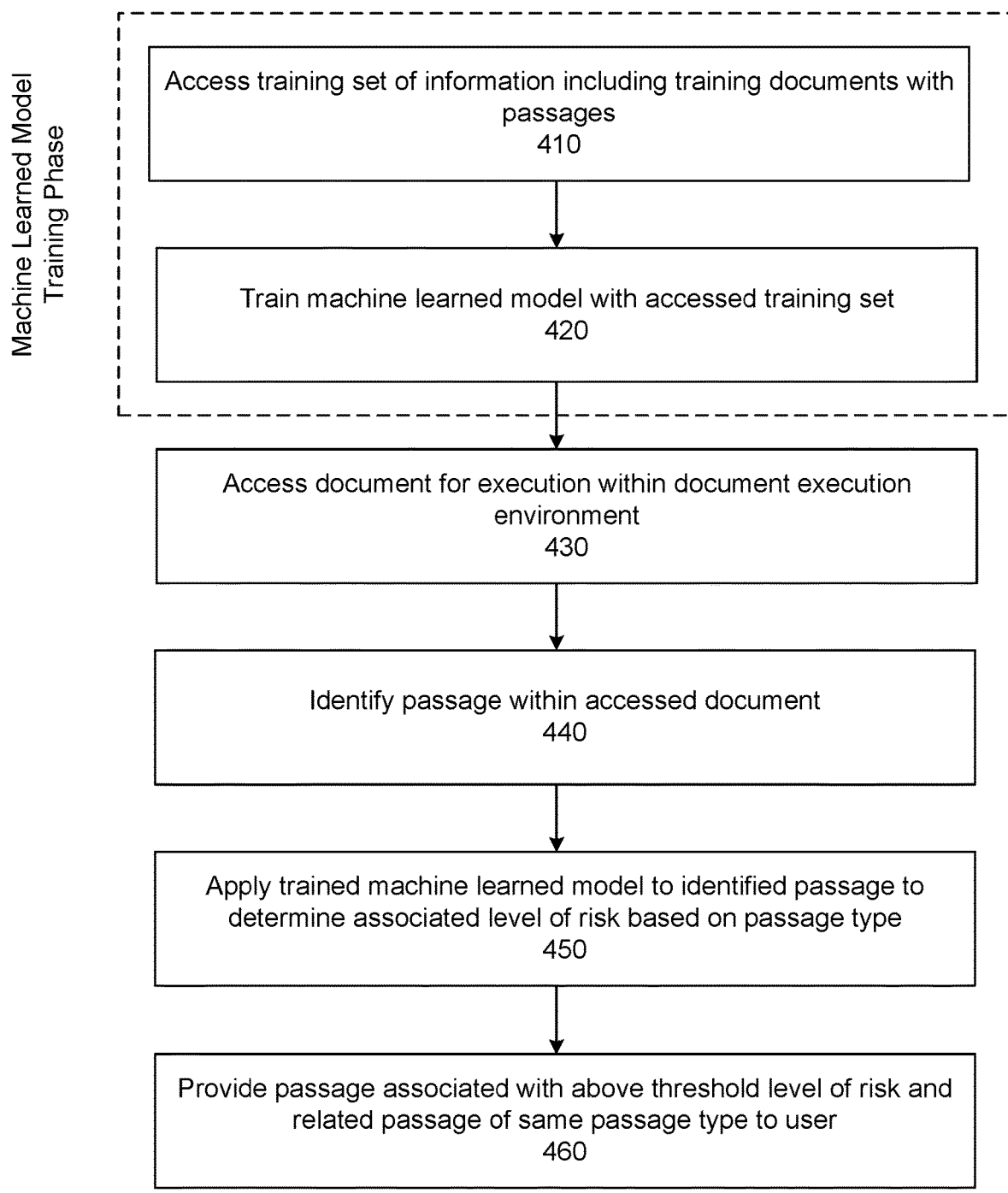
FIG. 4 illustrates an example process for identifying high-risk passages in a document within a document execution environment, in accordance with one or more embodiments.

FIG. 4 illustrates an example process for identifying high-risk passages in a document within a document execution environment, in accordance with one or more embodiments.

A high-risk passage detection engine of the document execution environment accesses 410 a training set of information including (for example) training documents with passages. The passages are each associated with a passage type and a level of risk. In some embodiments, the training set of information may also include actions taken in response to the passages having levels of risk above a threshold. In some embodiments, the training set of information also includes information about the training documents from which the passages originate, such as a length of the training documents, a type of training documents, and an industry associated with the training documents.

The high-risk passage detection engine trains 420 a machine learned model using the accessed training set of information. The machine learned model determines relationships between documents, passages within the document, the types and levels of risk of the passages, and any actions taken in response to the levels of risk. For instance, the machine learned model may be a convolutional neural network that, when applied to subsequent passages within documents for execution in the document execution environment, can output a determined level of risk associated with each passage. In some embodiments, the machine learned model outputs passages that have associated risks above a threshold level, and therefore are high-risk.

The high-risk passage detection engine accesses 430 a document for execution within the document execution environment. For instance, the document can be a contract or employment agreement uploaded to the document execution environment by a client device. Likewise, the document can be created and collaboratively modified within the document execution environment by a number of entities. The documents for execution may be associated with an organization and/or a customer account within the document execution environment. The high-risk passage detection engine accesses the document for execution by receiving, generating, and/or accessing a stored document for execution within the document execution environment.

The high-risk passage detection engine identifies 440 a passage within the accessed document. The passage is a portion of the document, such as a legal clause, with an associated passage type. In some embodiments, the high-risk passage detection engine identifies a subset of the passages within the accessed document that correspond to a specific passage type (such as a passage type specified by a user of the document execution environment).

The high-risk passage detection engine applies 450 the trained machine learned model to the identified passage within the document for execution. The trained machine learned model is configured to identify a type of the identified passage and/or determine a level of risk associated with the identified passage, for instance based at least in part on a passage type of the identified passage. The high-risk passage detection engine can then determine whether the identified passage is associated with a level of risk that is greater than a threshold level of risk.

If the identified passage is determined to be associated with an above-threshold level of risk, the high-risk passage detection engine identifies a related passage of the same passage type from a second document. The high-risk passage detection engine provides 460 both the high-risk passage and the related passage to the user via a client device, for instance within different portions of an interface for simultaneously display. In some embodiments, the high-risk passage detection engine provides recommendations on how to mitigate the risk presented by the high-risk passage. In some embodiments, if the identified passage is determined to have a below threshold level of risk, the high-risk passage detection engine does not flag the passage for review by the user.

In some embodiments, the high-risk passage detection engine provides the identified high-risk passages to a user associated with an organization associated with the received document for execution. It should be noted that although the example of FIG. 4 is described in the context of a passage within a document, in practice, the process of FIG. 4 can be applied to a plurality of passages in documents associated with one or more user accounts and/or one or more organizations or entities.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   accessing a training set of information including training documents within a document execution environment, each training document including one or more passages, each passage associated with a passage type and a level of risk;
training a machine learned model based on the accessed training set of information, the machine learned model configured to determine a level of risk associated with a document passage based on least in part on the passage type of the document passage;
accessing a document for execution within the document execution environment;
identifying a set of passages within the accessed document for execution;
applying the trained machine learned model to each of the identified set of passages to determine an associated level of risk for each of the identified set of passages based on a passage type of each of the identified set of passages;
in response to determining that the level of risk associated with an identified passage is above a threshold, identifying a related passage of the same passage type within a second document in the document execution environment; and
providing, to a device of a user, the identified passage associated with the above-threshold level of risk for display within a first portion of an interface and the identified related passage within the second document for simultaneous display within a second portion of the interface.

2. The method of claim 1, wherein each training document is associated with a set of document characteristics comprising one or more of a document type, a region, a language, and an industry, and wherein the machine learned model is configured to determine a level of risk associated with a document passage based additionally on the set of document characteristics associated with a document in which the document passage appears.

3. The method of claim 1, wherein accessing the document for execution comprises at least one of:
receiving the document for execution from a user of the document execution environment;
generating the document for execution within the document execution environment; and
accessing the document for execution, the document for execution stored within the document execution environment.

4. The method of claim 1, wherein the passage type for a passage comprises one or more of: a type of a legal clause, a type of business clause, a type of finance clause, and a type of content within the passage.

5. The method of claim 1, wherein the identified related passage includes an above-threshold amount of similar content to content of the identified passage.

6. The method of claim 1, wherein providing, to the device of the user, the identified passage and the identified related passage for display comprises indicating one or more differences between the identified passage and the identified related passage.

7. The method of claim 1, further comprising:
receiving, from the device of the user, an input specifying a passage type; and
identifying the set of passages within the accessed document for execution based on the passage type specified by the received input.

8. The method of claim 1, further comprising:
determining a passage type of each of the set of identified passages within the accessed document for execution; and
providing, to the device of the user, an indication of the passage type associated with the identified passage within a third portion of the interface.

9. The method of claim 1, wherein the threshold level of risk is set by the user, an entity associated with the user, or by an entity associated with the document execution environment.

10. The method of claim 9, wherein the recommendations to mitigate the level of risk include one or more of: a recommendation to provide the accessed document for execution to additional users for review, a recommendation to have additional users digitally sign the accessed document for execution, and a recommendation for one or more security measures to be implemented in association with the accessed document for execution.

11. The method of claim 1, further comprising:
providing, to the device of the user, recommendations to mitigate the level of risk associated with the identified passage.

12. The method of claim 11, wherein providing the recommendation to mitigate the level of risk associated with the identified passage comprises providing an interface element that, when interacted with by the user, performs one or more mitigation actions associated with the provided recommendation.

13. A non-transitory computer readable storage medium comprising computer executable instructions that when executed by one or more processors causes the one or more processors to perform operations comprising:
accessing a training set of information including training documents within a document execution environment, each training document including one or more passages, each passage associated with a passage type and a level of risk;
training a machine learned model based on the accessed training set of information, the machine learned model configured to determine a level of risk associated with a document passage based on least in part on the passage type of the document passage;
accessing a document for execution within the document execution environment;
identifying a set of passages within the accessed document for execution;
applying the trained machine learned model to each of the identified set of passages to determine an associated level of risk for each of the identified set of passages based on a passage type of each of the set of passages;
in response to determining that the level of risk associated with an identified passage is above a threshold, identifying a related passage of the same passage type within a second document in the document execution environment; and
providing, to a device of a user, the identified passage associated with the above-threshold level of risk for display within a first portion of an interface and the identified related passage within the second document for simultaneous display within a second portion of the interface.

14. The non-transitory computer readable storage medium of claim 13, wherein each training document is associated with a set of document characteristics comprising one or more of a document type, a region, a language, and an industry, where the machine learned model is configured to determine a level of risk associated with a document passage based additionally on the set of document characteristics associated with a document in which the document passage appears.

15. The non-transitory computer readable storage medium of claim 13, wherein the instructions that cause the processors to access the document for execution further cause the processors to perform operations comprising at least one of:
receiving the document for execution from a user of the document execution environment;
generating the document for execution within the document execution environment; and
accessing the document for execution, the document for execution stored within the document execution environment.

16. The non-transitory computer readable storage medium of claim 13, wherein the passage type for a passage comprises one or more of: a type of a legal clause, a type of business clause, a type of finance clause, and a type of content within the passage.

17. The non-transitory computer readable storage medium of claim 13, wherein the identified related passage includes an above threshold amount of similar content to content of the identified passage.

18. The non-transitory computer readable storage medium of claim 13, wherein the instructions that cause the processors to provide, to the device of the user, the identified passage and the identified related passage for display further cause the processors to perform operations comprising indicating one or more differences between the identified passage and the identified related passage.

19. The non-transitory computer readable storage medium of claim 13, wherein the instructions further cause the processors to perform operations comprising:
providing, to the device of the user, recommendations to mitigate the level of risk associated with the identified passage.

20. A computer system comprising:
one or more computer processors; and
a non-transitory computer readable storage medium comprising computer executable instructions that when executed by one or more processors causes the one or more processors to perform operations comprising:
accessing a training set of information including training documents within a document execution environment, each training document including one or more passages, each passage associated with a passage type and a level of risk;
training a machine learned model based on the accessed training set of information, the machine learned model configured to determine a level of risk associated with a document passage based on least in part on the passage type of the document passage;
accessing a document for execution within the document execution environment;
identifying a set of passages within the accessed document for execution;
applying the trained machine learned model to each of the identified set of passages to determine an associated level of risk for each of the identified set of passages based on a passage type of each of the identified set of passages;
in response to determining that the level of risk associated with an identified passage is above a threshold, identifying a related passage of the same passage type within a second document in the document execution environment; and
providing, to a device of a user, the identified passage associated with the above-threshold level of risk for display within a first portion of an interface and the identified related passage within the second document for simultaneous display within a second portion of the interface.

* * * * *